United States Patent
Desanti et al.

(10) Patent No.: US 12,118,231 B2
(45) Date of Patent: Oct. 15, 2024

(54) SYSTEMS AND METHODS FOR NVMe OVER FABRIC (NVMe-oF) NAMESPACE-BASED ZONING

(71) Applicant: DELL PRODUCTS L.P., Round Rock, TX (US)

(72) Inventors: Claudio Desanti, Santa Cruz, CA (US); Joseph LaSalle White, San Jose, CA (US); Erik Smith, Douglas, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 170 days.

(21) Appl. No.: 17/386,305

(22) Filed: Jul. 27, 2021

(65) Prior Publication Data
US 2023/0053071 A1    Feb. 16, 2023

(51) Int. Cl.
G06F 3/00       (2006.01)
G06F 3/06       (2006.01)

(52) U.S. Cl.
CPC .......... G06F 3/0655 (2013.01); G06F 3/0604 (2013.01); G06F 3/067 (2013.01)

(58) Field of Classification Search
CPC ....... G06F 3/0655; G06F 3/0604; G06F 3/067
See application file for complete search history.

(56) References Cited

U.S. PATENT DOCUMENTS

| | | |
|---|---|---|
| 2009/0006501 A1 | 1/2009 | Bharadwaj et al. |
| 2013/0304951 A1 | 11/2013 | Goel et al. |
| 2016/0381549 A1 * | 12/2016 | Lam ......................... H04W 4/14 455/414.1 |
| 2018/0074717 A1 | 3/2018 | Olarig |
| 2018/0081558 A1 | 3/2018 | Ish et al. |
| 2018/0270119 A1 | 9/2018 | Ballapuram |
| 2019/0245924 A1 | 8/2019 | Li |
| 2020/0065269 A1 | 2/2020 | Balasubramani |
| 2020/0081640 A1 | 3/2020 | Enz |
| 2020/0310657 A1 | 10/2020 | Cayton |

(Continued)

OTHER PUBLICATIONS

Notice of Allowance and Fee(s) Due, mailed Aug. 3, 2022, in related U.S. Appl. No. 17/386,120. (9 pgs).

(Continued)

*Primary Examiner* — Craig S Goldschmidt
(74) *Attorney, Agent, or Firm* — BAUGH LAW, LLC

(57) ABSTRACT

A traditional storage platform performs many basic functions, such as storage partitions allocation (i.e., namespace masking) and many advanced functions, such as deduplication or dynamic storage allocation. These functions need to be managed and this results in a multiple management system paradigm in which a fabric management application manages the fabric connectivity policies (i.e., zoning), while a storage management application manages the storage namespace mappings and advanced functions. Embodiments herein provide for centralized management for both connectivity and storage namespace mapping, among other advanced features. Namespace zoning information may comprise namespace zone groups, namespace zones, namespace zone members, namespace zone aliases, and namespace zone alias members, which expand the Non-Volatile Memory Express (NVMe) over Fabrics (NVMe-oF) zoning framework from just connectivity control to full namespace allocation.

20 Claims, 18 Drawing Sheets

(56) References Cited

U.S. PATENT DOCUMENTS

| | | |
|---|---|---|
| 2020/0319812 A1 | 10/2020 | He |
| 2020/0349094 A1 | 11/2020 | Smith |
| 2020/0409893 A1 | 12/2020 | Puttagunta |
| 2021/0019272 A1 | 1/2021 | Olarig |
| 2021/0028987 A1 | 1/2021 | Krivenok |
| 2021/0034270 A1* | 2/2021 | Gupta .................. G06F 13/1668 |
| 2021/0064281 A1 | 3/2021 | Satapathy |
| 2021/0124695 A1 | 4/2021 | Jaiswal |
| 2021/0406174 A1* | 12/2021 | Gole .................. G06F 12/0246 |

OTHER PUBLICATIONS

"FC and FCOE versus iSCSI—"Network-centric" versus "End-Node-centric" provisioning," [online], [Retrieved Oct. 12, 2020]. Retrieved from Internet <URL: https://brasstacksblog.typepad.com/brass-tacks/2012/02/fc-and-fcoe-versus-iscsi-network-centric-versus-end-node-centric-provisioning.html> (6pgs).

"NVMe over Fabrics' Discovery problem," [online], [Retrieved Oct. 12, 2020] Retrieved from Internet <URL: https://brasstacksblog.typepad.com/brass-tacks/2017/12/nvme-over-fabrics-discovery-problem.html> (2pgs).

"Hard zoning versus soft zoning in a FC/FCoE SAN," [online], [Retrieved Oct. 12, 2020] Retrieved from Internet <URL: https://brasstacksblog.typepad.com/brass-tacks/2012/01/hard-zoning-versus-soft-zoning-in-a-fcfcoe-san.html> (5pgs).

"NVM Express Over Fabrics," revision 1.0, May 31, 2016, [online], [Retrieved Oct. 12, 2020] Retrieved from Internet <URL:http://nvmexpress.org> (49pgs).

"NVM Express Over Fabrics," revision 1.1, Oct. 22, 2019, [online], [Retrieved Oct. 12, 2020] Retrieved from Internet <URL:http://nvmexpress.org> (83pgs).

"NVM Express Base Specification," revision 1.4, Jun. 10, 2019, [online], [Retrieved Oct. 12, 2020] Retrieved from Internet <URL:http://nvmexpress.org> (403pgs).

Notice of Allowance and Fee(s) Due maild Dec. 8, 2021, in related U.S. Appl. No. 16/925,131. (7pgs).

Notice of Allowance and Fee(s) Due maild Oct. 13, 2021, in related U.S. Appl. No. 16/898,216. (5pgs).

Notice of Allowance and Fee(s) Due maild Oct. 13, 2021, in related U.S. Appl. No. 16/898,191. (5pgs).

Non-Final Office Action, mailed Feb. 3, 2022, in U.S. Appl. No. 17/194,251. (11pgs).

"Fibre Channel," Generic Services-7 (FC-GS-7), [online], [Retrieved Feb. 17, 2022]. Retrieved from Internet <URL: https://standards.incits.org/apps/group_public/download.php/81982/T11-2016-300v0.pdf> INCITS working draft proposed American National Standard for Information Technology, 2016. (397pgs).

Response to Non-Final Office Action, filed May 3, 2022, in related U.S. Appl. No. 17/194,251. (11 pgs).

Notice of Allowance and Fee(s) Due mailed, May 16, 2022, in related U.S. Appl. No. 17/194,251. (7 pgs).

Non-Final Office Action, mailed Mar. 10, 2022, in U.S. Appl. No. 17/200,896. (10 pgs).

Response to Non-Final Office Action, filed Jun. 10, 2022, in U.S. Appl. No. 17/200,896. (11 pgs).

Notice of Allowance and Fee(s) Due mailed, Jun. 30, 2022, in U.S. Appl. No. 17/200,896. (8 pgs).

Non-Final Office Action, mailed Mar. 10, 2022, in U.S. Appl. No. 17/239,462. (8 pgs).

Response to Non-Final Office Action, filed May 31, 2022, in U.S. Appl. No. 17/239,462. (9 pgs).

Final Office Action, mailed Jun. 10, 2022, in U.S. Appl. No. 17/239,462. (6 pgs).

Response to Final Office Action, filed Jun. 10, 2022, in U.S. Appl. No. 17/239,462. (8 pgs).

Notice of Allowance and Fee(s) Due mailed, Jun. 27, 2022, in U.S. Appl. No. 17/239,462. (7 pgs).

* cited by examiner

| Zone Name | ZoneGroup (Florence, NQN(CDC)) {Pisa, NQN(Storage3)} | | ZoneGroup (Siena, NQN(CDC)) | |
|---|---|---|---|---|
| | αβ | γδε | φ | λ |
| Zone Members | {Host A, host} | {Host B, host} | {Host E, host} | {Host A, host} |
| | {Storage 1, subsystem} | {Host C, host} | {Storage 4, subsystem} | {Storage 4, subsystem} |
| | {Storage 2, subsystem} | {Host D, host} | {Storage 5, subsystem} | |
| | | {Storage 3, subsystem} | | |

300

305 — ZoneGroup (Florence, NQN(CDC))
310 — ZoneGroup (Pisa, NQN(Storage3))
315 — ZoneGroup (Siena, NQN(CDC))

SYSTEMS AND METHODS FOR NVMe OVER FABRIC (NVMe-oF) NAMESPACE-BASED ZONING

BACKGROUND

A. Technical Field

The present disclosure relates generally to information handling systems. More particularly, the present disclosure relates to storage systems and methods.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A traditional storage platform performs many basic functions, such as storage partitions allocation (i.e., namespace masking) and many advanced functions, such as deduplication or dynamic storage allocation. These functions need to be managed, but currently there are limited or complicated management solutions.

Consider, by way of illustration, the management model shown in FIG. 1 for a storage area network (SAN) 100. As illustrated, a fabric management application 115 manages the fabric connectivity policies (i.e., zoning) through the centralized discovery controller (CDC) 110, while a storage management application 120 manages the storage namespace mappings and advanced functions.

Such a system has several issues. First, it requires separate management applications and interfaces for the fabric connectivity policies (i.e., zoning) and for the storage namespace mappings and related functions. Second, the separate management interfaces add complexity and added steps for configuration and management. Third, as devices change, the management becomes more complex or ineffective. For example, the world of disaggregated architectures tends to prefer simpler storage devices, such as JBOFs (Just a Bunch Of Flash) or EBOFs (Ethernet Bunch Of Flash). These devices typically have limited (or no) resources for management. Thus, the approach of accessing such a storage device directly via a management application (e.g., via storage management application 120) to manage the device may be limited or not work.

Also, zoning for a non-volatile memory express (NVMe) over Fabric (NVMe-oF) system involves specifying connectivity access control information. For example, as illustrated in FIG. 1, connectivity access control information may be provided on a CDC 110 of the NVMe-oF fabric. The Zoning information enables the CDC to perform filtering of Name Server information when replying to Get Log Page requests, a technique also known as "Soft Zoning", and in this way control the connectivity allowed over an IP-based NVMe-oF fabric. However, current Zoning data structures do not allow for managing the subsequent layer of connectivity access, in which hosts are allowed to access specific Namespaces in NVM subsystems.

Accordingly, what is needed are new and better ways to dealing with namespace-based zoning.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 3 depicts an example set of active zone groups, according to embodiments of the present disclosure.

DETAILED DESCRIPTION OF EMBODIMENTS

Figure 1:
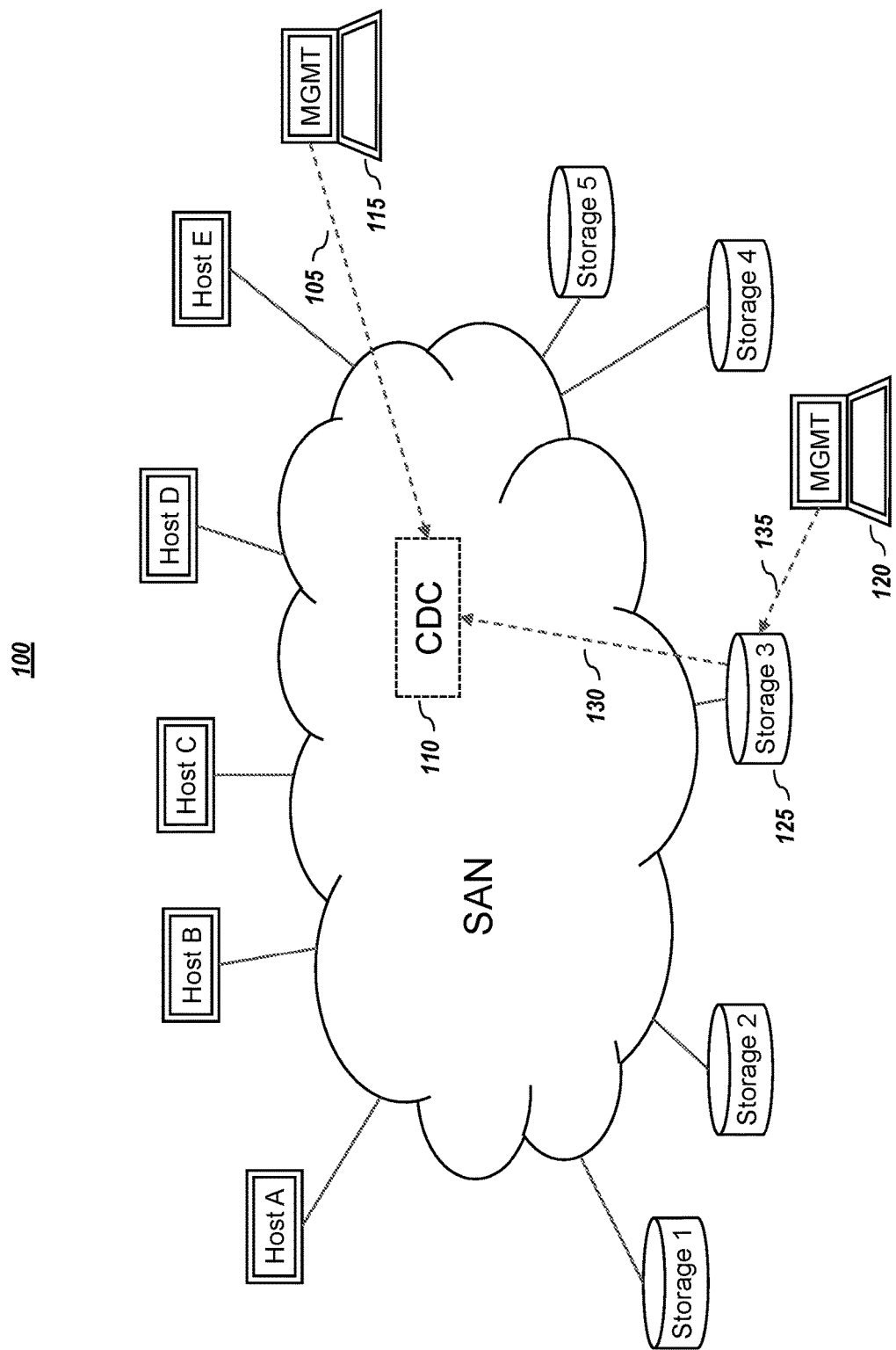
FIG. 1 depicts a storage area network (SAN) system with two separate management model.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of EBOF or JBOF storage and NVMe-oF SAN environments, aspects of the present disclosure are not so limited. Accordingly, the aspects of the present disclosure may be applied or adapted for use in other contexts.

A. General Introduction

Figure 2:
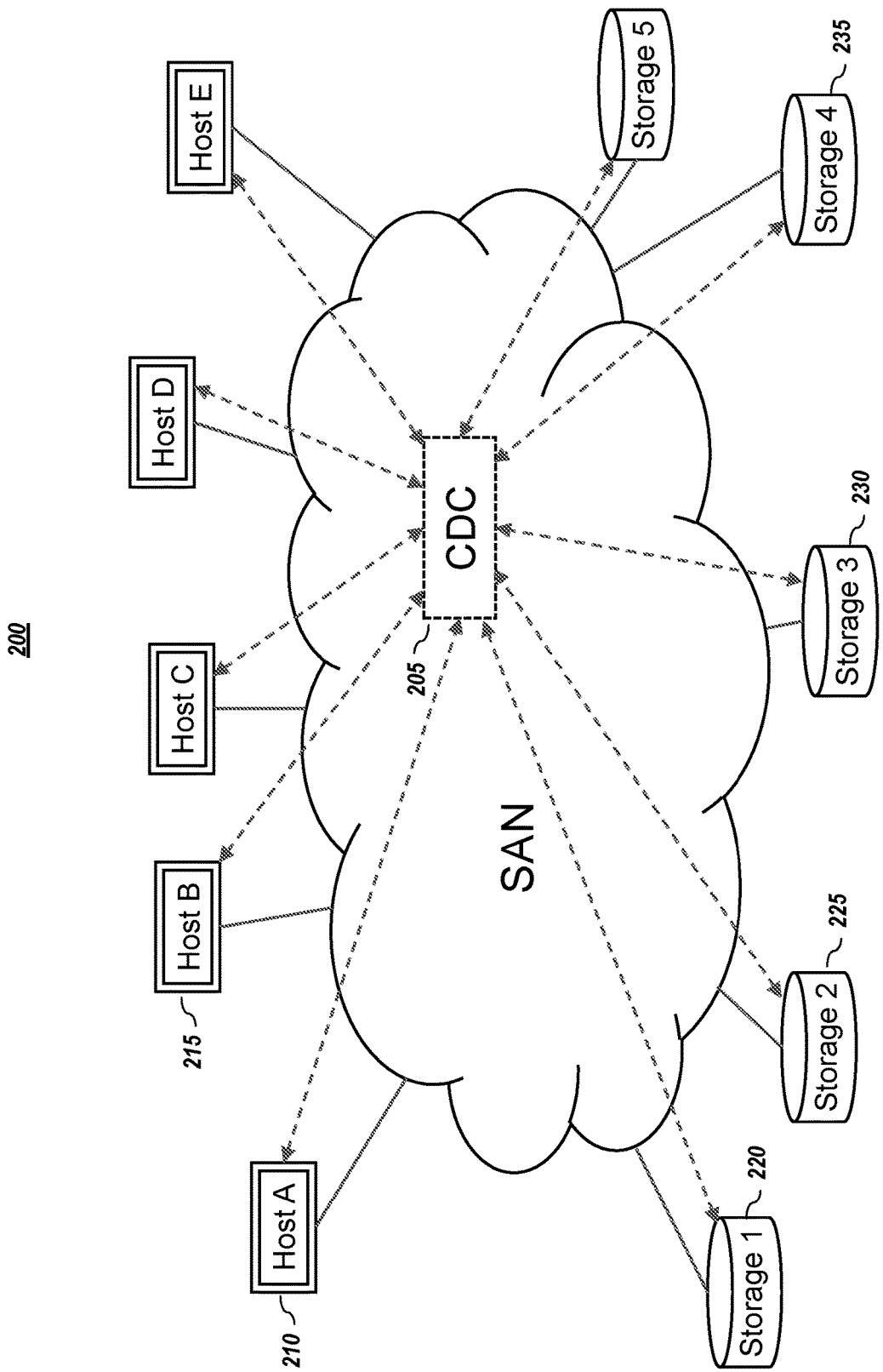
FIG. 2 depicts a storage area network that comprises a centralized zoning datastore, according to embodiments of the present disclosure.

FIG. 2 depicts a storage area network 200 that comprises a centralized zoning datastore 205, according to embodiments of the present disclosure. The CDC 205 represents an entity that maintains the pertinent fabric information and provides a single or centralized management interface for control and management of the NVMe over Fabrics (NVMe-oF) network. In one or more embodiments, one or more information handling systems within a network, such as a cloud environment, comprise or support the CDC 205, which comprises a zoning datastore that helps facilitate zoning features of the present disclosure. Also depicted in FIG. 2 are hosts and storage devices that may be configured for access between the different devices according to zoning.

As illustrated in FIG. 2., in a CDC-controlled NVMe-oF SAN, as illustrated by the dashed lines, each storage subsystem connects to the CDC 205 to register its information and each host connects to the CDC to discover which subsystems the host can connect to. Zoning may be considered as a methodology or means the CDC uses to subset the information registered by the subsystems so that each host sees only the subsystem (i.e., storage) assigned to that host. That is, zoning for NVMe-oF involves specifying connectivity access control information. Zoning information enables the CDC to perform filtering of Name Server information when replying to requests by NVMe entities, such as hosts, for access control information, which helps control the connectivity allowed over an IP-based NVMe-oF fabric.

Figure 4:
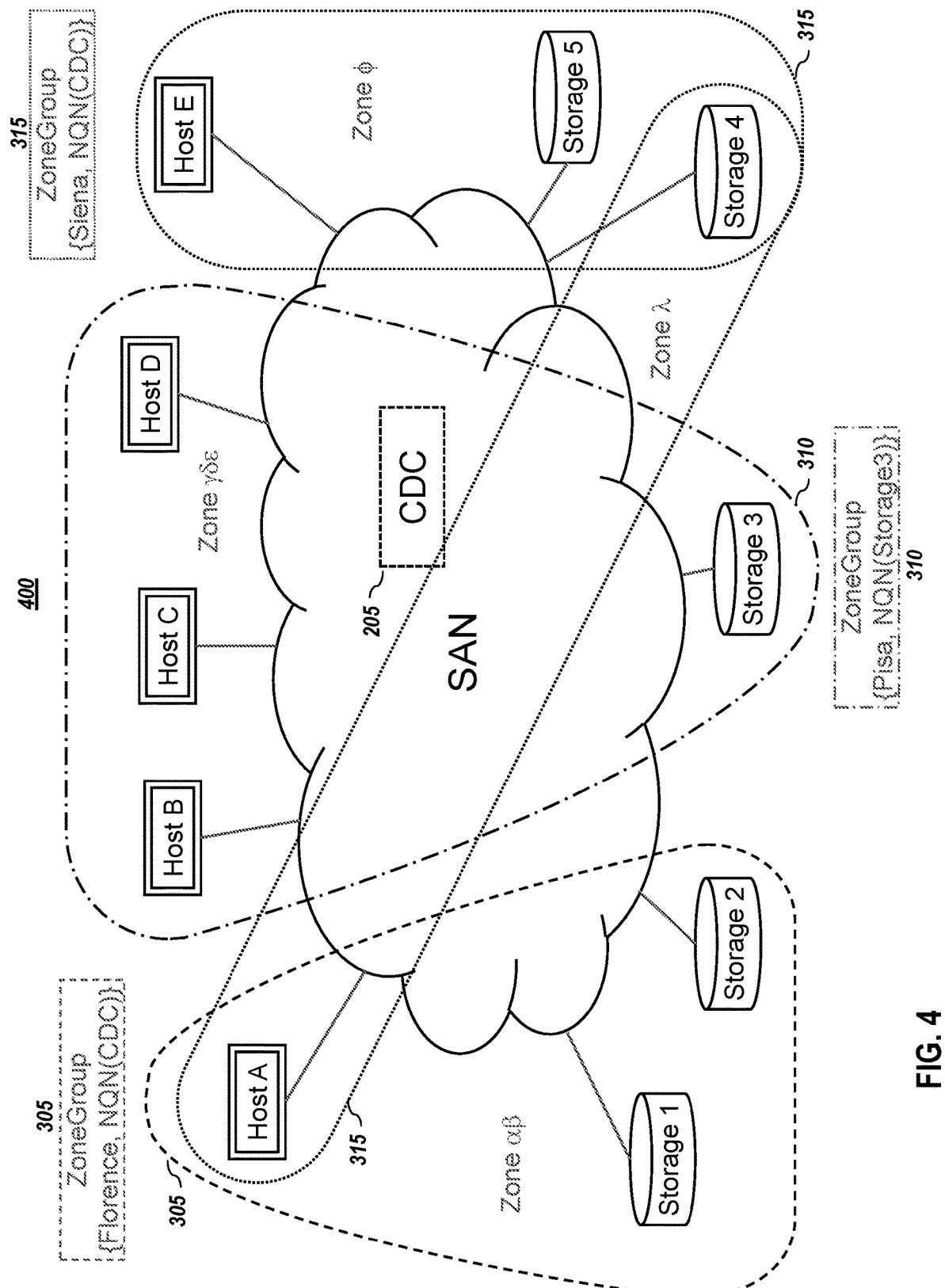
FIG. 4 graphically depicts a SAN network with the active zone groups and zones from FIG. 3, according to embodiments of the present disclosure.

Consider by way of illustration the active zone group shown in FIG. 3. In FIG. 3, there are three zone groups: ZoneGroup Florence 305, ZoneGroup Pisa 310, and ZoneGroup Siena 315. The depicted embodiment of FIG. 3 includes zone member roles (e.g., host or subsystem). FIG. 4 graphically depicts a SAN network 400 with the active zone groups and zones from FIG. 3, according to embodiments of the present disclosure. Note that the zone group configurations allow the hosts to establish the following connections:

Host A connects with storage 1, 2, and 4;
Host B connects with storage 3;
Host C connects with storage 3;
Host D connects with storage 3; and
Host E connects with storage 4 and 5.

Note also that the depicted embodiment does not contain just 2-member zones as typically done. In the depicted embodiment, role access rules define the proper access control. In zone ϕ, host E can access storage 4 and storage 5, but storage 4 and storage 5 cannot communicate, which resolves issues of implementations that do not have defined role access rules.

As noted previously, in one or more embodiments, zoning configurations (i.e., ZoneGroups) are maintained by the CDC. ZoneGroups may be generated, activated, and deactivated: (1) by a SAN administrator through a management application, in which the ZoneGroup originator is the CDC's NVMe Qualified Name (NQN) (e.g., ZoneGroups {Florence, NQN(CDC)} and {Siena, NQN(CDC)}); or (2) by a subsystem (e.g., storage 3) through in-band management commands, in which the ZoneGroup originator is the subsystem's NQN (e.g., ZoneGroup {Pisa, NQN(Storage3)}). A subsystem may generate ZoneGroup(s) as a result of storage allocation configurations defined by a storage administrator. Embodiments for Zoning are discussed in co-pending and commonly-owned U.S. patent application Ser. No. 17/194,251, filed on 6 Mar. 2021, entitled "DYNAMIC CONNECTIVITY MANAGEMENT THROUGH ZONE GROUPS", which patent document is incorporated by reference herein in its entirety and for all purposes.

As noted above, a traditional storage platform performs many basic functions, such as storage partitions allocation (i.e., namespace masking) and many advanced functions, such as deduplication or dynamic storage allocation. These functions are managed, which results in a management model as shown in FIG. 1. A fabric management application manages the fabric connectivity policies (i.e., Zoning) through the CDC, while a storage management application manages the storage namespace mappings and advanced functions. As shown in FIG. 1, Storage 3 may leverage the namespace masking information to generate its own Zoning information and provide them to the CDC in the Subsystem Driven Zoning (SDZ) framework.

Figure 5:
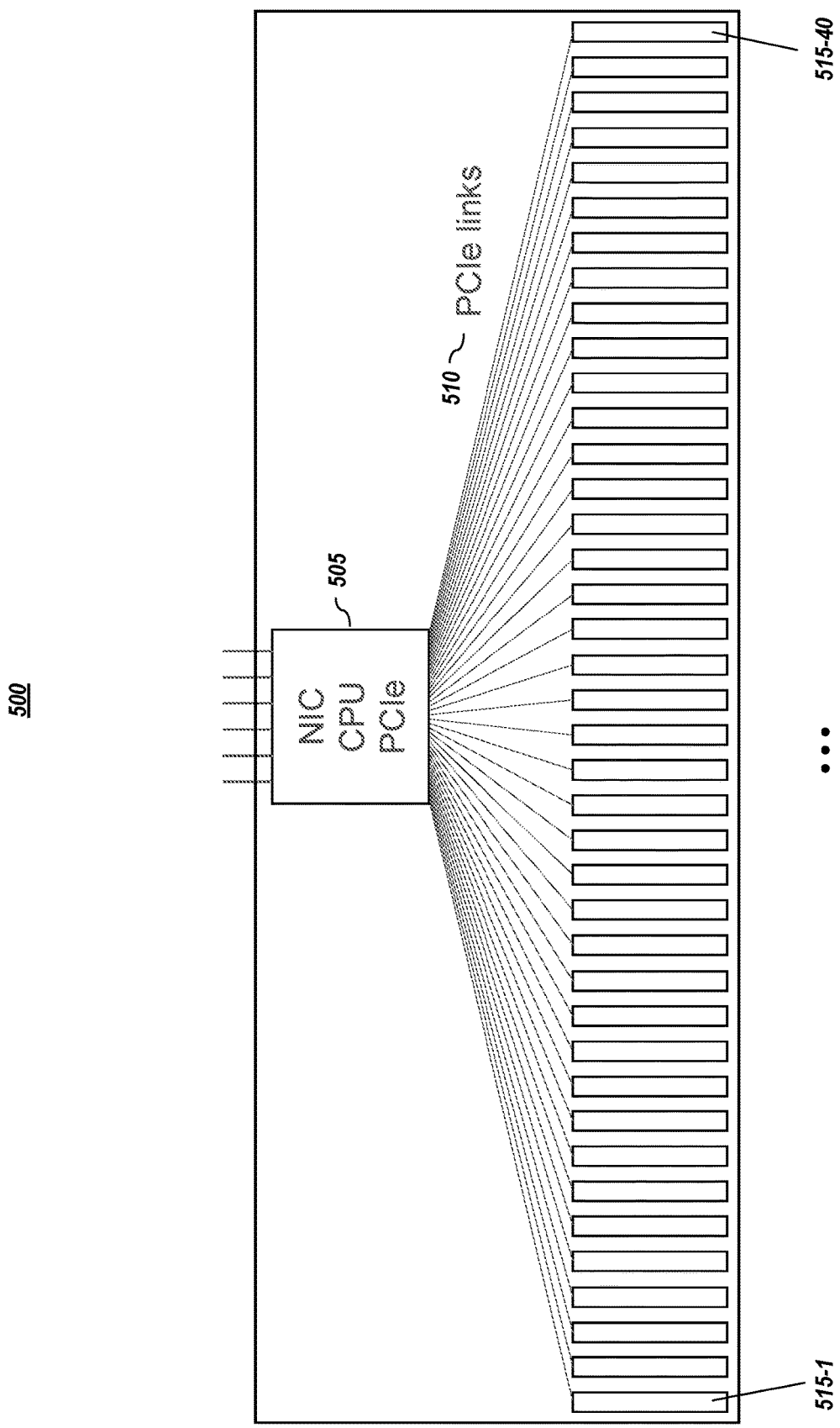
FIG. 5 graphically depicts the structure of an exemplary NVMe 40-SSD (solid state drive) JBOF storage, according to embodiments of the present disclosure.

However, the world of disaggregated architectures prefers simpler storage devices, such as JBOFs (Just a Bunch Of Flash) or EBOFs (Ethernet Bunch Of Flash). FIG. 5 graphically depicts the structure of an exemplary NVMe 40-SSD JBOF. Such a unit 500 may be attached to a fabric through Ethernet interfaces; however, access to the individual SSDs 515-x happens through PCIe links 510, with a powerful CPU 505 converting data from Ethernet to PCIe format and vice versa. Specifically, NVMe/TCP connections may be terminated by the CPU complex in order to interact with the SSDs over the PCIe links. The CPU complex is also able to implement SSD partitioning and namespace masking functions and a management interface; therefore, it is possible for a JBOF with sufficient processing resources to be managed according to the typical management model.

Figure 6:
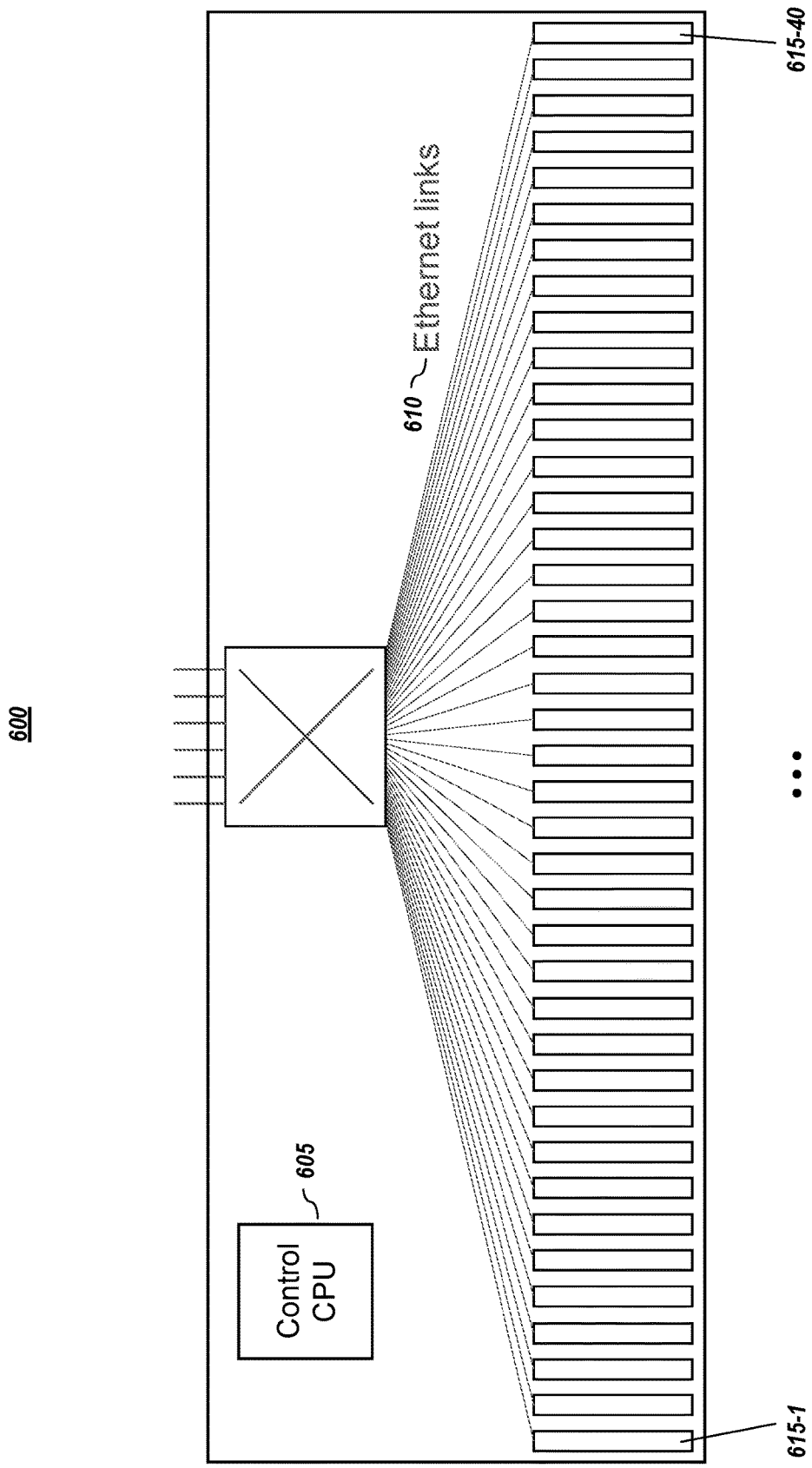
FIG. 6 graphically illustrates the structure of an exemplary NVMe 40-SSD EBOF, according to embodiments of the present disclosure.

FIG. 6 graphically illustrates the structure of an exemplary NVMe 40-SSD EBOF. In this case, there is no protocol translation from Ethernet to PCIe: a host intending to access storage on an EBOF connects directly with the specific Ethernet SSD 615-x hosting the namespace (i.e., the storage partition) the host intends to access. The control CPU 605 provides lower-level management functions needed for the operations of the EBOF and may not be able to provide a management interface.

Figure 7:
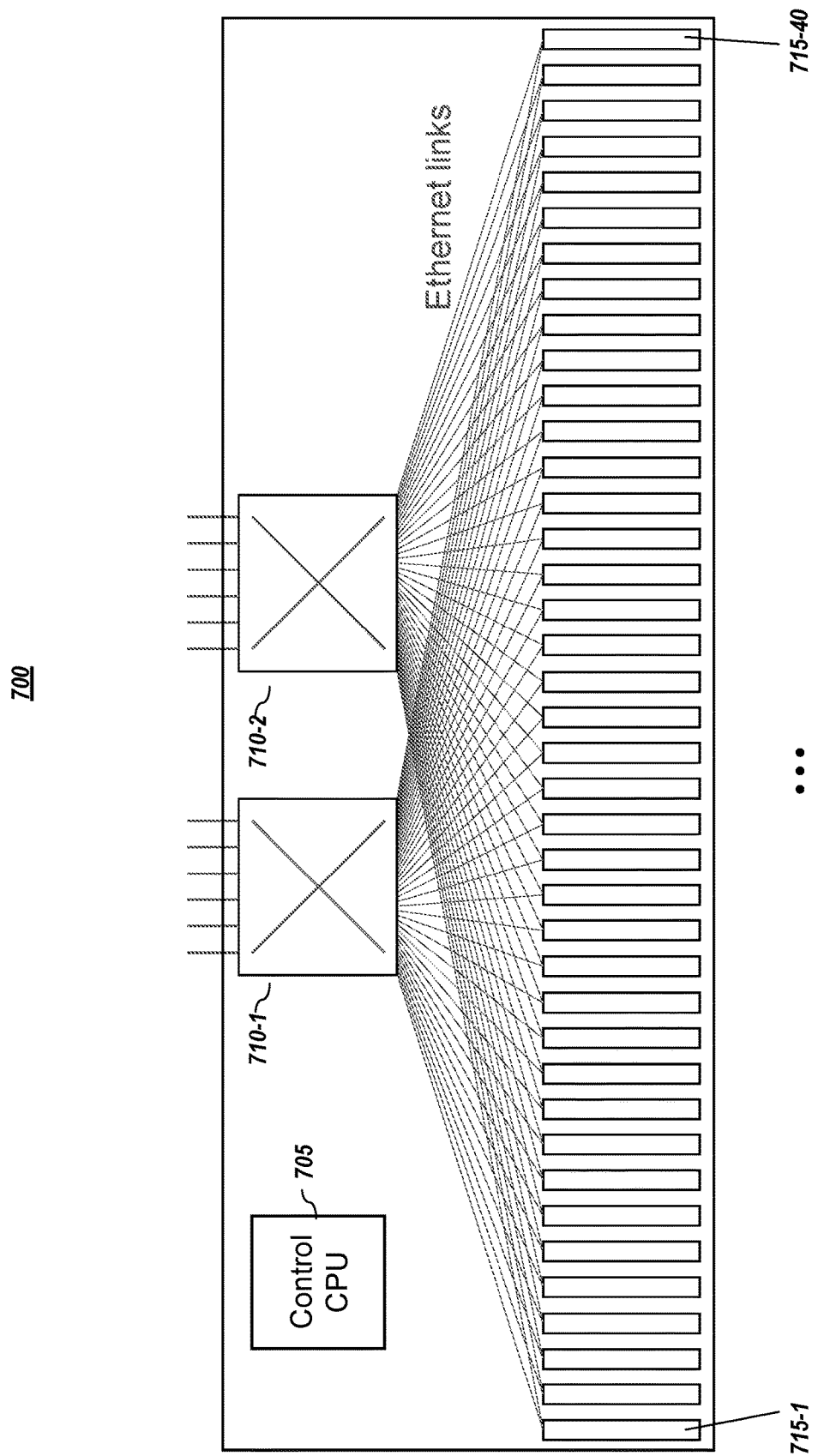
FIG. 7 graphically depicts a structure of an exemplary dual-ported NVMe 40-SSD EBOF, according to embodiments of the present disclosure.

FIG. 7 graphically depicts a structure of an exemplary dual-ported (710-1 and 710-2) NVMe 40-SSD EBOF, according to embodiments of the present disclosure. The difference with the structure 600 shown in FIG. 6 is that each Ethernet SSD 715-x is dual ported (i.e., ports 710-1 and 710-2) to allow for SAN A/SAN B operations. Also, there is no protocol translation from Ethernet to PCIe: a host intending to access storage on an EBOF connects directly with the specific Ethernet SSD hosting the namespace (i.e., the storage partition) the host intends to access. The control CPU 705 provides just lower-level management functions needed for the operations of the EBOF and may not be able to provide a high-level management interface. Thus, embodiments of Namespace-based Zoning presented herein offer different management models and access control data structures to better manage such systems.

B. Systems and Methods Embodiments

Figure 8:
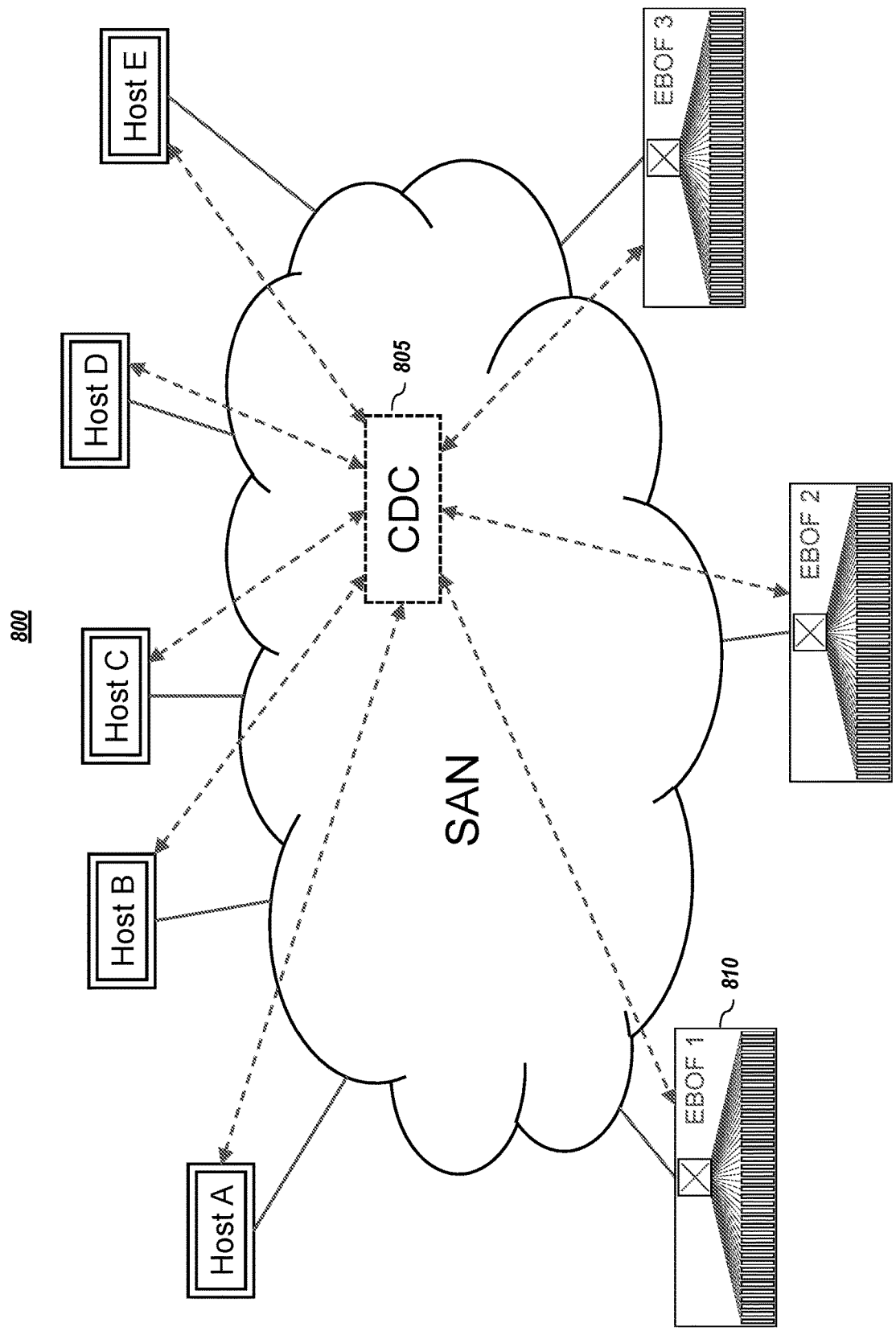
FIG. 8 shows an example of an NVMe EBOF-based SAN with a centralized controller, according to embodiments of the present disclosure.

FIG. 8 shows an example of an NVMe EBOF-based SAN 800 with a Centralized Discovery Controller (CDC) 805, according to embodiments of the present disclosure. In one or more embodiments, the CDC 805 maintains zoning information and NQN-to-transport-addresses mapping information. In one or more embodiments, each NVMe-oF entity, including the EBOFs, connects with the CDC to register or discover other entities.

In one or more embodiments, the CDC is extended to manage the EBOFs' namespaces allocation to hosts in addition to maintaining all the NQN-to-transport-address mappings. Being an EBOF, which typically are simple devices, it may interact with the CDC via pull registrations. For example, after discovering via the CDC via Multicast DNS (mDNS), an EBOF may issue a Kickstart Request to the CDC and then let the CDC retrieve the information. Examples of Kickstart Requests and discover are found in co-pending and commonly-owned U.S. patent application Ser. No. 17/239,462, filed on 23 Apr. 2020, entitled "KICKSTART DISCOVERY CONTROLLER CONNECTION COMMAND", which patent application is a continuation-in-part of and claims priority benefit under 35 USC § 120 to U.S. patent application Ser. No. 16/898,216, filed on 10 Jun. 2020, entitled "IMPLICIT DISCOVERY CONTROLLER REGISTRATION OF NON-VOLATILE MEMORY EXPRESS (NVMe) ELEMENTS IN AN NVMe-OVER-FABRICS (NVMe-OF)", which patent application is a continuation-in-part of and claims priority benefit under 35 USC § 120 to co-pending and commonly-owned U.S. patent application Ser. No. 16/898,191, filed on 10 Jun. 2020, entitled "TARGET DRIVEN ZONING FOR ETHERNET IN NON-VOLATILE MEMORY EXPRESS OVER-FABRICS (NVMe-OF) ENVIRONMENTS", which patent application: (1) is a continuation-in-part of and claims priority benefit under 35 USC § 120 to co-pending and commonly-owned U.S. patent application Ser. No. 16/820,547, filed on 16 Mar. 2020, entitled "DISCOVERY CON- TROLLER REGISTRATION OF NON-VOLATILE MEMORY EXPRESS (NVMe) ELEMENTS IN AN NVMe-OVER-FABRICS (NVMe-oF) SYSTEM"; and (2) claims priority to and the benefit of under 35 USC § 119 the provisional patent application entitled "TARGET DRIVEN ZONING FOR ETHERNET IN NON-VOLATILE MEMORY EXPRESS OVER-FABRICS (NVMe-OF) ENVIRONMENTS," Indian Patent Application Number 202011017755, filed in the Indian Patent Office on 25 Apr. 2020. Each patent document is incorporated by reference herein in its entirety and for all purposes. In one or more embodiments, as part of registration, the CDC learns the NQN and other connectivity information about the storage subsystem.

In one or more embodiments, the CDC retrieves the namespace information from an EBOF by performing steps comprising: (1) issuing a "Get Log Page" request to get the transport address(es) of the individual Ethernet SSDs at the storage subsystem; and (2) connecting to each individual Ethernet SSD and issuing an "Identify" command to retrieve the namespaces defined and available on that Ethernet SSD. In one or more embodiments, this namespace information may be used to establish namespace zoning comprising one or more hosts and one or more storage elements (e.g., Ethernet SSD) of the storage subsystem.

Figure 9:
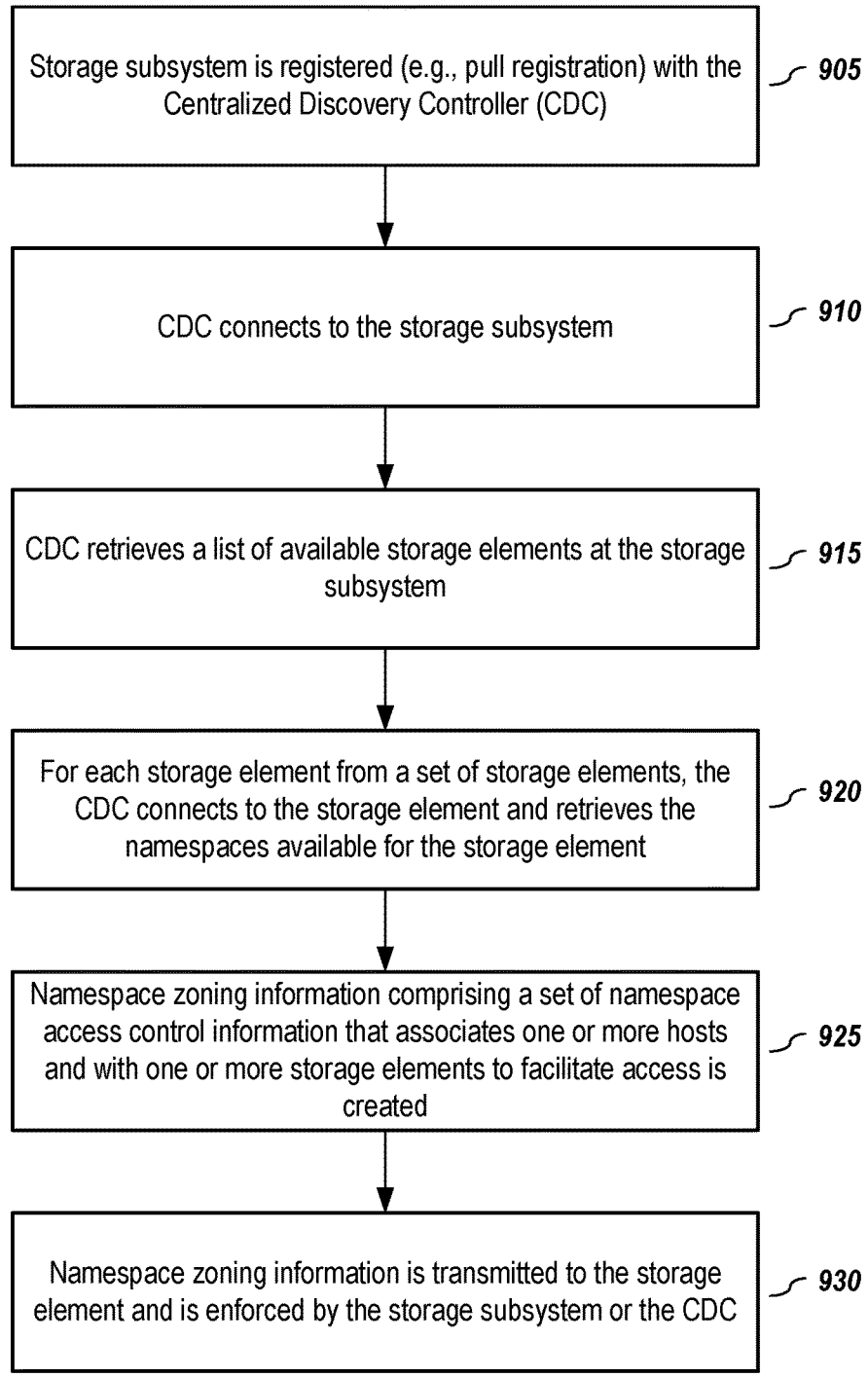
FIG. 9 depicts a method for namespace zoning, according to embodiments of the present disclosure.

FIG. 9 depicts another method for namespace zoning, according to embodiments of the present disclosure. In one or more embodiments, a storage subsystem (e.g., EBOF 1 810 in FIG. 8) is registered (905) (e.g., via pull registration) with a Centralized Discovery Controller (CDC) (e.g., CDC 805 in FIG. 8). The CDC connects (910) to the storage subsystem and retrieves (915) a list of available storage elements at the storage subsystem. For each storage element from a set of storage elements, the CDC connects (920) to the storage element and retrieves the namespaces available for the storage element. In one or more embodiments, namespace zoning information is created (925), which may comprise a set of namespace access control information or rules that associates one or more hosts and with one or more storage elements to facilitate access. Example embodiments of zoning information are provided below. Finally, in one or more embodiments, namespace zoning information is transmitted to the storage element (930). The namespace zoning access control may be enforced by the storage subsystem or by the CDC.

Referring to the EBOF example shown in FIG. 6, the above methods allow the CDC to associate the EBOF's NQN with the 40 (or more if multiple transports (e.g., TCP and RoCE) are supported) transport addresses of the storage elements (e.g., Ethernet SSD) hosted in the EBOF 600 and the associated namespaces identifiers (NSIDs).

Referring to the EBOF example shown in FIG. 7, the above methods allow the CDC to associate the EBOF's NQN with the 80 (or more if multiple transports (e.g., TCP and RoCE) are supported) transport addresses of the storage elements (e.g., Ethernet SSD) hosted in the EBOF and the associated namespaces identifiers (NSIDs).

Figure 10:
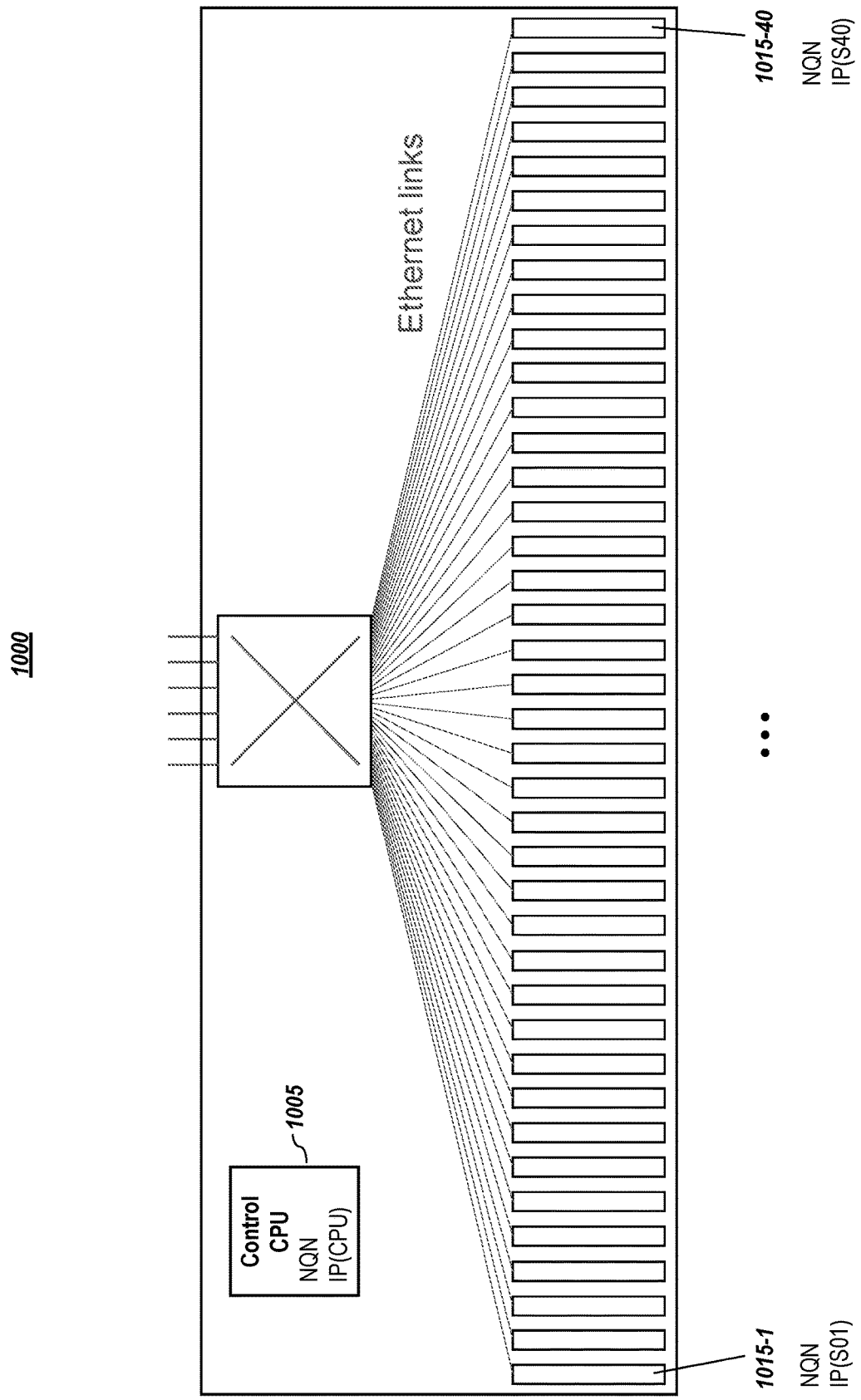
FIG. 10 depicts an example storage subsystem, according to embodiments of the present disclosure.

FIG. 10 depicts an example storage subsystem, according to embodiments of the present disclosure. The depicted storage subsystem 1000 comprises a control CPU 1005 that has an NQN and an IP address for the overall storage system CPU. In this depicted embodiment, each of the storage elements 1015-1 through 1015-40 shares the same NQN with the CPU complex 1005 of the storage subsystem 1000 but has a different IP address as indicated as IP(S01) through IP(S40). In one or more embodiments, the CPU 1005 may register with the CDC using, for example, a kickstart discovery request. The CDC may connect using {NQN, IP(CPU)}, which NQN is the CPU's/storage subsystem's NQN and retrieve a list of IP addresses (e.g., {IP(Sxx)}) for the storage elements 1015-x. In one or more embodiments, the CDC connects to each storage element using the storage subsystem's NQN and the storage element specific IP address (e.g., {NQN, IP(Sxx)}), issues an "Identify" command to retrieve namespaces, and issues an "Identify Namespace" command to each namespace to retrieve the namespace identifier (e.g., NGUID), in which the namespace may be identified using a namespace globally unique identifier (e.g., {NGUID}).

Figure 11:
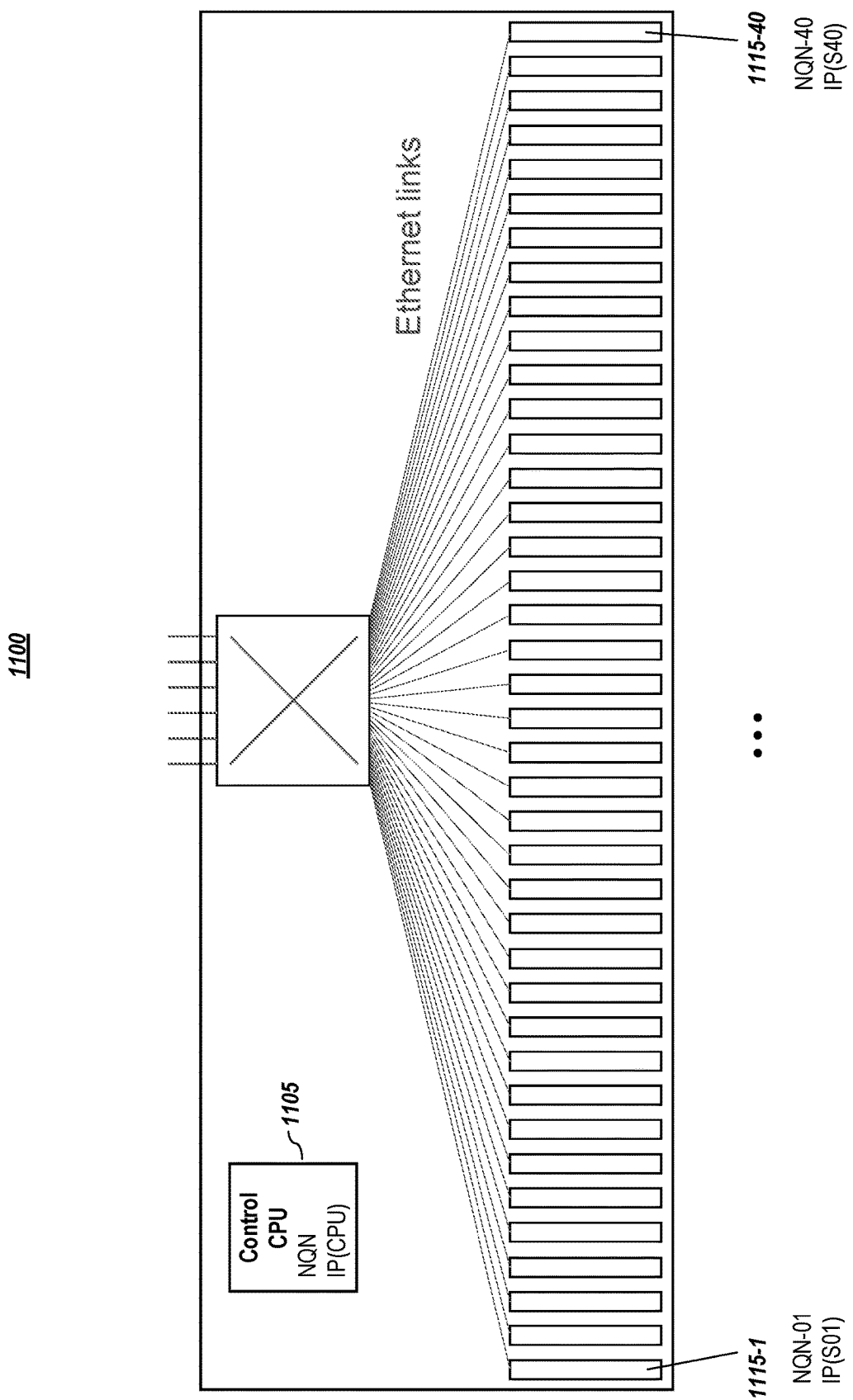
FIG. 11 depicts another example storage subsystem, according to embodiments of the present disclosure.

FIG. 11 depicts an example storage subsystem, according to embodiments of the present disclosure. The depicted storage subsystem 1100 comprises a control CPU 1105 that has an NQN and an IP address for the overall storage system CPU. In this depicted embodiment, each of the storage elements 1115-1 through 1115-40 has its own NQN that is different from the control CPU 1105 of the storage subsystem 1100, and may also have a different IP address as well, as indicated as IP(S01) through IP(S40). In one or more embodiments, the process of obtaining namespace information is very similar to that described above with respect to FIG. 10 with the exceptions that the CDC retrieves a list of identifiers comprising, for each storage element, its NQN and IP address (e.g., {NQN-xx, IP(Sxx)}), and it is this information (i.e., {NQN, IP(Sxx)}) that the CDC uses to connect to a storage element to retrieve the namespace identifier(s) (e.g., NGUID) for the storage element.

Figure 12:
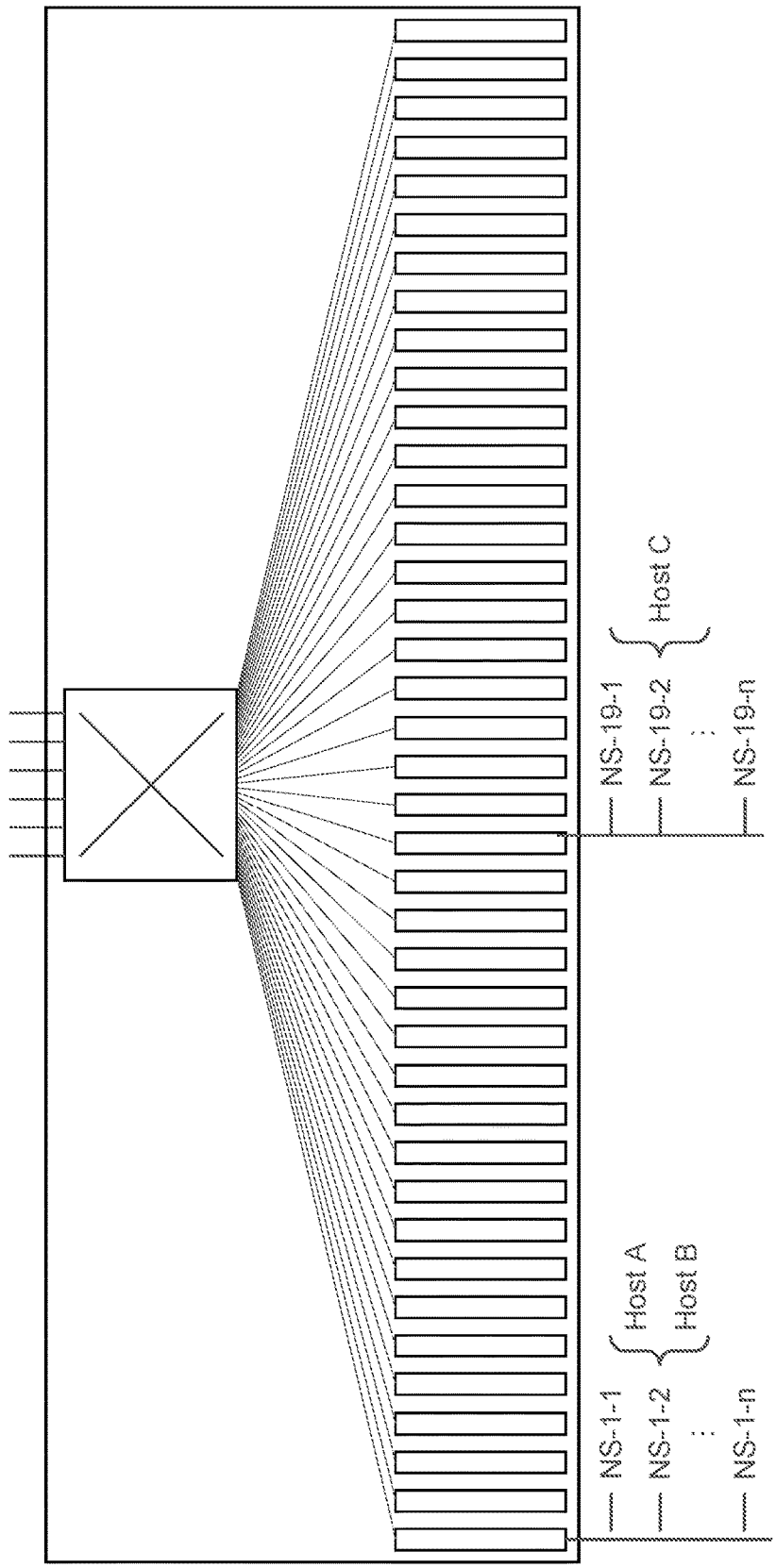
FIG. 12 graphically shows a way to perform the association task for a single-ported storage system, according to embodiments of the present disclosure.

As noted above, in one or more embodiments, an NVMe fabric administrator may access this information on the CDC to associate the discovered namespaces to specific hosts or host ports. FIG. 12 graphically shows a method to perform the association task for a single-ported storage system 1200, according to embodiments of the present disclosure. As illustrated, namespace NS-1-2 is associated with Host A and Host B, which means that each of these hosts are allowed to access that specific namespace on that storage element of that storage subsystem. Similarly, Host C is allowed to access namespace NS-19-2.

Figure 13:
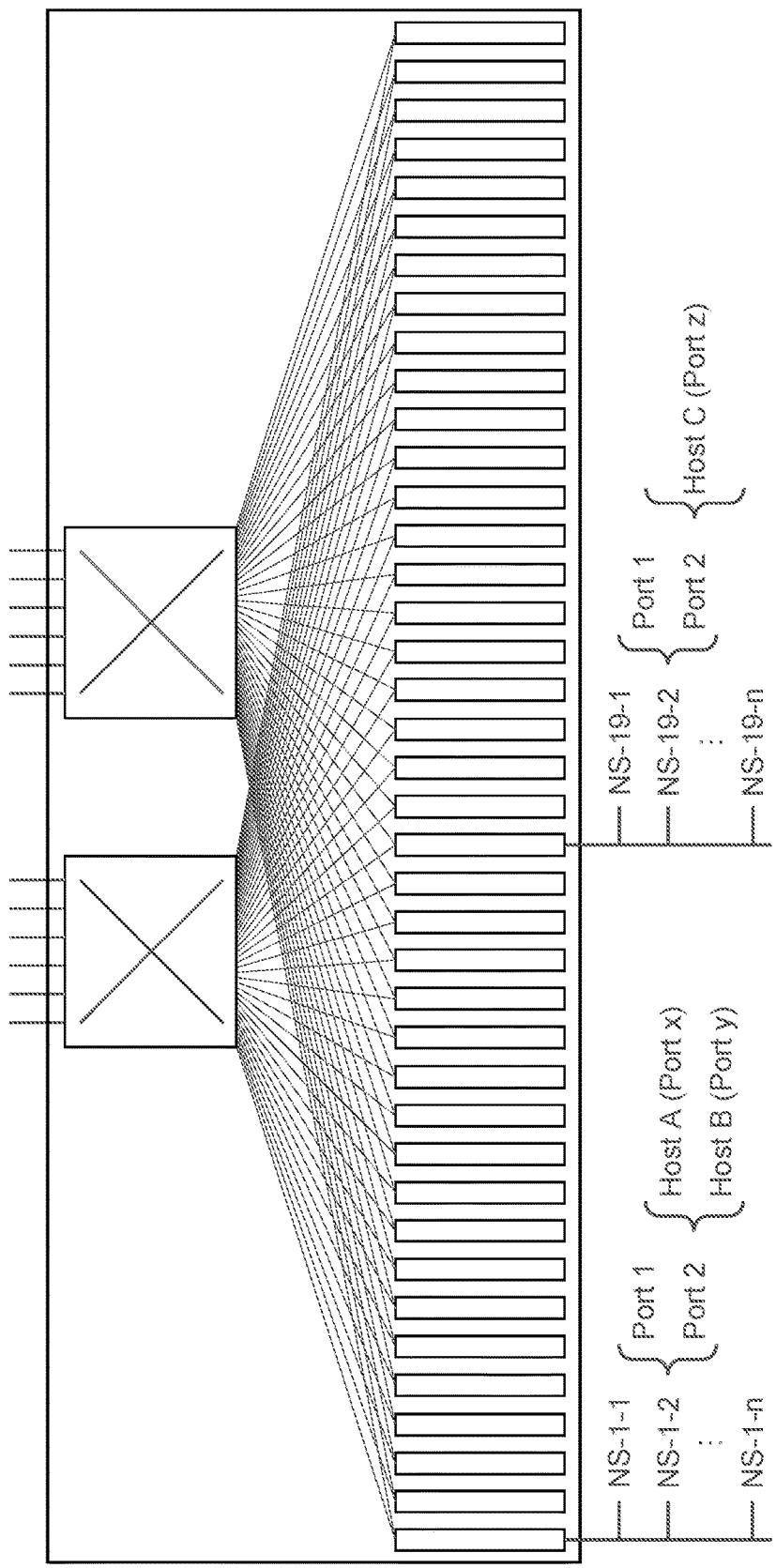
FIG. 13 graphically shows a way to perform the association task for a dual-ported storage system, according to embodiments of the present disclosure.

FIG. 13 graphically shows a way to perform the association task for a dual-ported storage system 1300, according to embodiments of the present disclosure. As shown in FIG. 13, the second namespace on the first Ethernet SSD is associated to port x of Host A and port y of Host B through its Ethernet SSD's port 2. The second namespace of the 19th Ethernet SSD is associated to port z of Host C through its Ethernet SSD's port 2.

These associations may be translated into a fabric Zone-Groups configuration to control connectivity access and into a Namespace ZoneGroups configuration to control namespace masking. The fabric ZoneGroups configuration may be provided to the switches of the fabric for packet-by-packet enforcement, as discussed in co-pending and commonly-owned U.S. patent application Ser. No. 17/386,120, filed on 27 Jul. 2021, entitled "NON-VOLATILE MEMORY EXPRESS OVER FABRIC (NVMe-oF) ZONE SUBSETS FOR PACKET-BY-PACKET ENFORCEMENT", which claims priority to U.S. Pat. App. No. 63/192,526, filed on 24 May 2021; each patent document is incorporated by reference herein in its entirety.

As noted above, in one or more embodiments, the Namespace ZoneGroups configuration is provided to the EBOFs in order to define which connections to accept and the appropriate responses to "Identify" commands sent from connected hosts. In one or more embodiments, a Namespace ZoneGroup is the unit of Namespace Zoning activation (i.e., a set of Namespace access control rules enforceable by the controlled subsystem) and may be uniquely identified by the pair {Namespace ZoneGroup Name, Controlled Subsystem NQN}. An embodiment of a format of Namespace Zone-Group is shown in TABLE 1, below:

TABLE 1

| Namespace ZoneGroup Format | |
|---|---|
| Bytes | Description |
| | Namespace ZoneGroup Name |
| | Controlled Subsystem NQN |
| | Number of Namespace Zones (a) |
| | Namespace Zone #1 |
| | Namespace Zone #2 |
| | . . . |
| | Namespace Zone #a |

In one or more embodiments, a Namespace Zone is the unit of Namespace access control (i.e., specifies which hosts are able to access which Namespaces in the controlled subsystem), and a full Namespace Zone identifier may be: {{Namespace ZoneGroup Name, Controlled Subsystem NQN}, Namespace Zone Name}. An embodiment of a format of Namespace Zone is shown in TABLE 2, below.

TABLE 2

| Namespace Zone Format | |
|---|---|
| Bytes | Description |
| | Namespace Zone Name |
| | Number of Namespace Zone members (x) |
| | Namespace Zone member #1 |
| | Namespace Zone member #2 |
| | . . . |
| | Namespace Zone member #x |

Namespace Zone Member types may be defined as shown in TABLE 3, below.

TABLE 3

| Namespace Zone Member Types | | |
|---|---|---|
| Type | L | Value |
| 01h | | Host NQN |
| 02h | | Host NQN + IP + Protocol |
| 03h | | Controlled Subsystem NSID |

TABLE 3-continued

| Namespace Zone Member Types | | |
|---|---|---|
| Type | L | Value |
| 04h | | Controlled Subsystem NSID + IP + Protocol + Port |
| 05h | | Namespace ZoneAlias Name |

In the ZoneDBConfig, which represents the active zone groups in the NVMe-oF system, it is possible to group together a set of hosts requiring homogeneous access under a common Namespace ZoneAlias Name, that may be used to reference the entire set through a single name. As with connectivity Zoning, ZoneAliases may be resolved at activation time in order for a ZoneGroup to be enforced. An embodiment of a format of Namespace ZoneAlias is shown in TABLE 4, below.

TABLE 4

| Namespace ZoneAlias Format | |
|---|---|
| Bytes | Description |
| | Namespace ZoneAlias Name |
| | Number of Namespace ZoneAlias members (x) |
| | Namespace ZoneAlias member #1 |
| | Namespace ZoneAlias member #2 |
| | . . . |
| | Namespace ZoneAlias member #x |

An embodiment of Namespace ZoneAlias Member types is defined in TABLE 5, below.

TABLE 5

| Namespace ZoneAlias Member Types | | |
|---|---|---|
| Type | L | Value |
| 01h | | Host NQN |
| 02h | | Host NQN + IP + Protocol |

Figure 14:
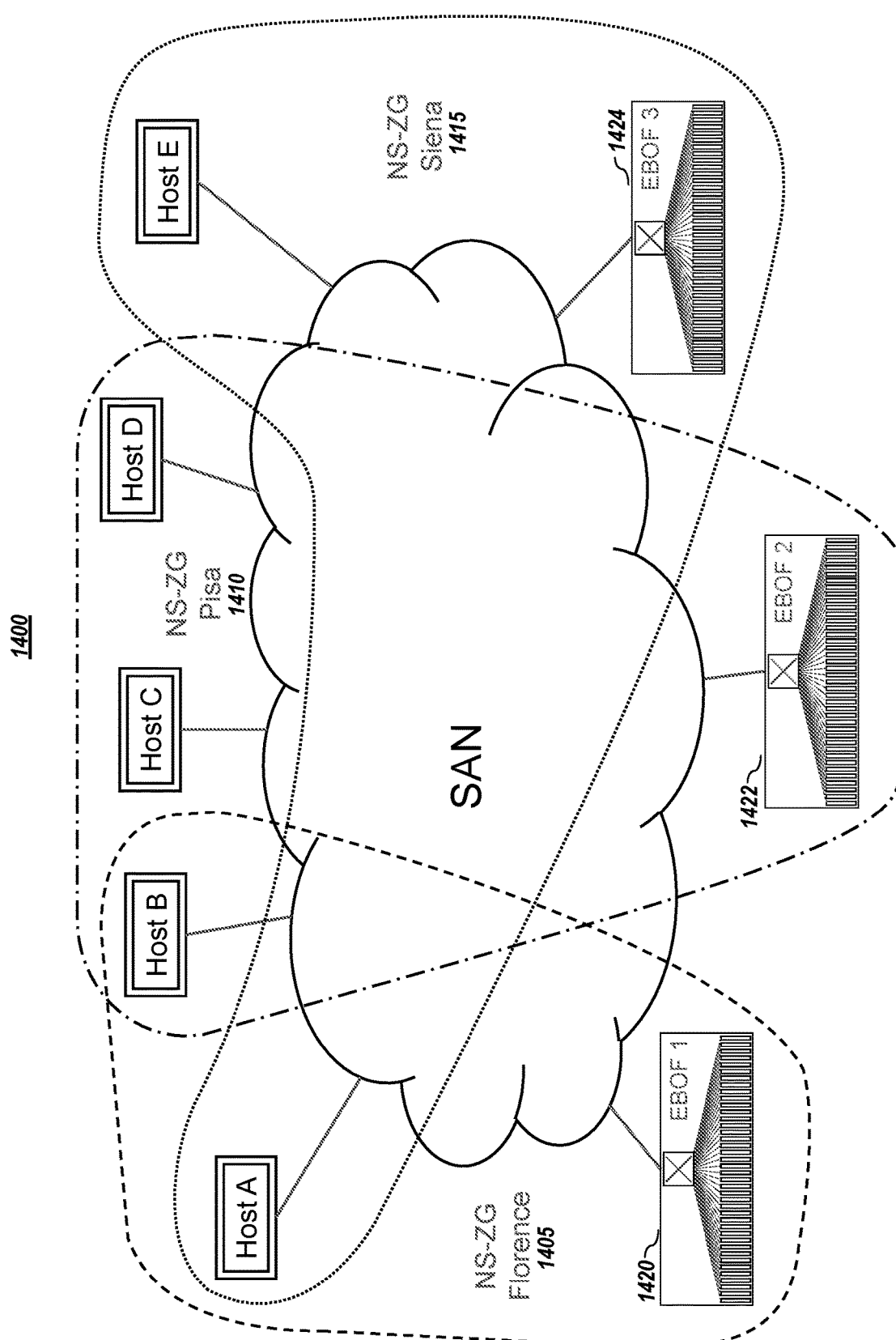
FIG. 14 depicts an example of an NVMe EBOF-based SAN, according to embodiments of the present disclosure.

By way of further illustration, consider the following example, which helps illustrate how Namespace Zoning works. FIG. 14 depicts an example of an NVMe EBOF-based SAN, according to embodiments of the present disclosure. The NVMe EBOF-based SAN 1400 comprises three NameSpace ZoneGroups (i.e., NS-ZG Florence 1405, NS-ZG Pisa 1410, and NS-ZG Siena 1415)—one per each controlled EBOF subsystem (i.e., EBOF-1 1420, EBOF-2 1422, and EBOF-3 1424). For the depicted embodiments, the related ZoneGroups definition is shown in TABLE 6, below.

TABLE 6

| Namespace ZoneGroup configuration shown in FIG. 14 | | | | | | |
|---|---|---|---|---|---|---|
| Namespace | Namespace ZoneGroup {Florence, NQN(EBOF1)} | | Namespace ZoneGroup {Pisa, NQN(EBOF2)} | | Namespace ZoneGroup {Siena, NQN(EBOF3)} | |
| Zone Name | α | β | γ | δ | ε | λ |
| Namespace Zone Members | NQN(Host A) | NQN(Host B) | NQN(Host B) | NQN(Host C) | NQN(Host A) | NQN(Host E) |
| | NSID-EBOF1(1) | NSID-EBOF1(3) | NSID-EBOF2(1) | NQN(Host D) | NSID-EBOF3(1) | NSID-EBOF3(3) |
| | NSID-EBOF1(2) | NSID-EBOF1(4) | NSID-EBOF2(2) | NSID-EBOF2(4) | NSID-EBOF3(2) | NSID-EBOF3(4) |
| | | NSID-EBOF1(5) | NSID-EBOF2(3) | NSID-EBOF2(5) | | NSID-EBOF3(5) |
| | | | | NSID-EBOF2(6) | | |

For the depicted embodiment, Namespace ZoneGroup {Florence, NQN(EBOF1)} controls the subsystem EBOF1 and defines two Namespace Zones, α and β. Namespace Zone α allows Host A to access the Namespaces having Namespace IDs NSID-EBOF1(1) and NSID-EBOF1(2) on EBOF1. Namespace Zone β allows Host B to access the Namespaces having Namespace IDs NSID-EBOF1(3), NSID-EBOF1(4), and NSID-EBOF1(5) on EBOF1.

For the depicted embodiment, Namespace ZoneGroup {Pisa, NQN(EBOF2)} controls the subsystem EBOF2 and defines two Namespace Zones, γ and δ. Namespace Zone γ allows Host B to access the Namespaces having Namespace IDs NSID-EBOF2(1), NSID-EBOF2(2), and NSID-EBOF2(3) on EBOF2. Namespace Zone δ allows Host C and Host D to both access the Namespaces having Namespace NSID-EBOF2(4), NSID-EBOF2(5), and NSID-EBOF2(6) on EBOF2.

For the depicted embodiment, Namespace ZoneGroup {Siena, NQN(EBOF3)} controls the subsystem EBOF3 and defines two Namespace Zones, ε and λ. Namespace Zone ε allows Host A to access the Namespaces having Namespace IDs NSID-EBOF3(1) and NSID-EBOF3(2) on EBOF3. Namespace Zone λ allows Host E to access the Namespaces having Namespace IDs NSID-EBOF3(3), NSID-EBOF3(4), and NSID-EBOF3(5) on EBOF3.

Figure 15:
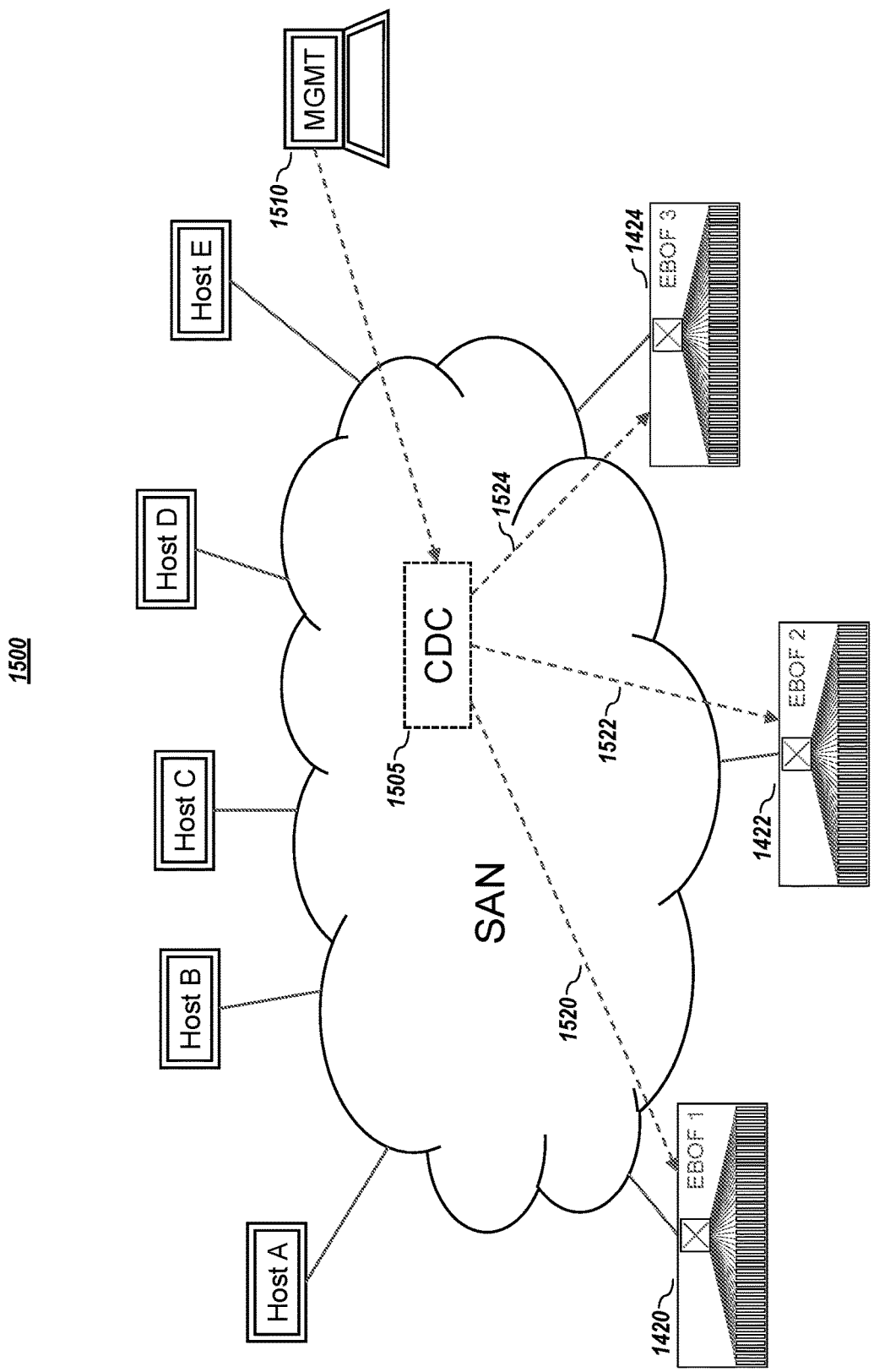
FIG. 15 depicts storage subsystem SAN management for the depicted example of FIG. 14, according to embodiments of the present disclosure.

The three Namespace ZoneGroups described above are distributed each to its controlled subsystem once activated on the CDC 1505 as shown in FIG. 15. That is, as illustrated, the CDC 1505 communicates (i.e., 1520, 1522, and 1524) the Namespace zoning information to each of the respective storage subsystems (i.e., storage subsystems 1402, 1422, and 1424, respectively).

Figure 16:
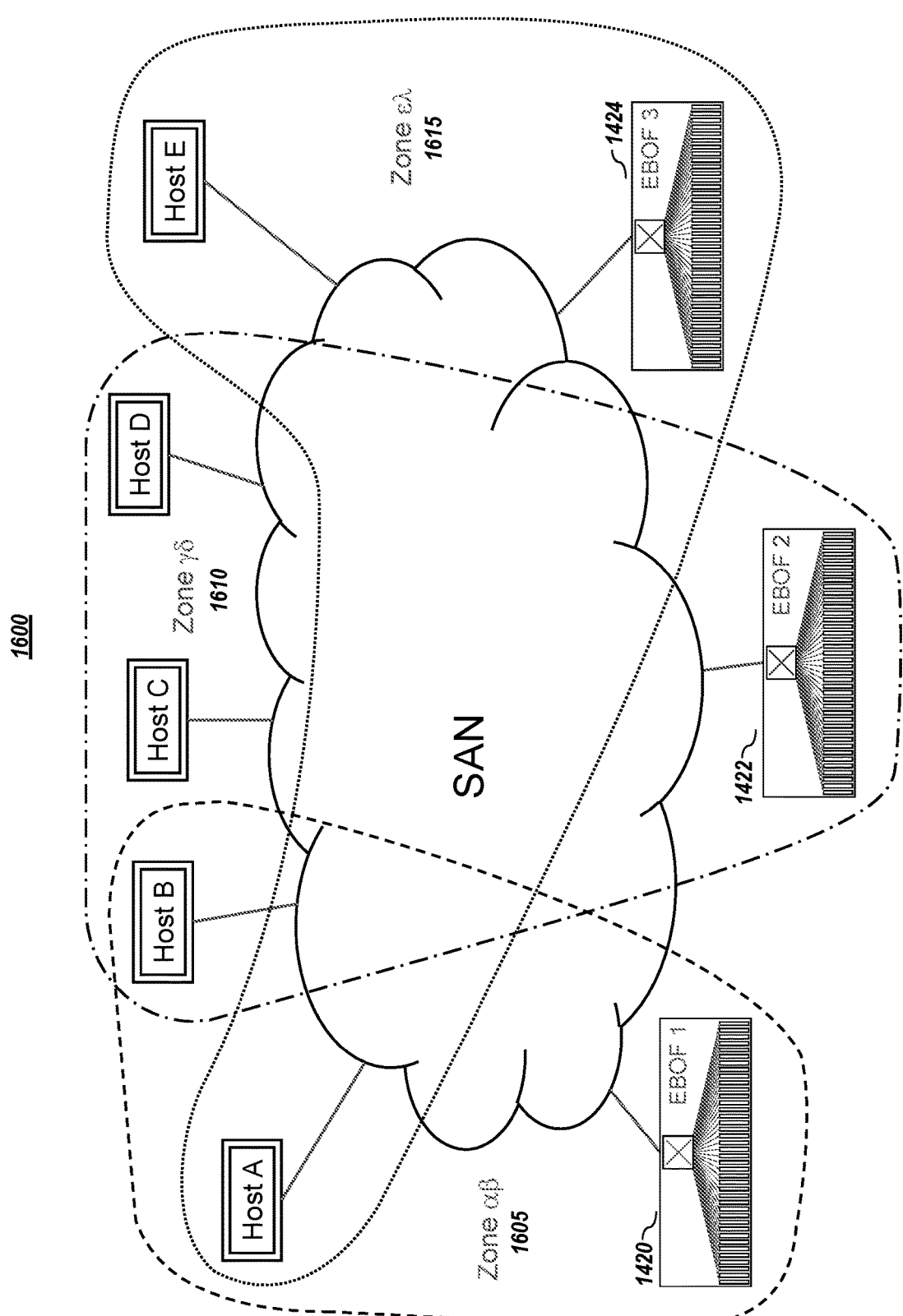
FIG. 16 depicts related connectivity Zoning configuration for the depicted example, according to embodiments of the present disclosure.

In one or more embodiments, as part of this access control configuration, a connectivity ZoneGroup is also activated by the CDC. The related connectivity ZoneGroup configuration is shown in TABLE 7 and represented in FIG. 16. Note the ZoneGroups 1605, 1610, and 1615 represent fabric connectivity and operate at a different layer than the namespace zoning.

TABLE 7

Related connectivity ZoneGroup definition

| Zone | ZoneGroup {Connectivity, NQN(CDC)} | | |
|---|---|---|---|
| Name | αβ | γδ | ελ |
| Zone Members | {Host A, host} {Host B, host} {EBOF 1, subsystem} | {Host B, host} {Host C, host} {Host D, host} {EBOF 2, subsystem} | {Host A, host} {Host E, host} {EBOF 3, subsystem} |

Finally, it shall be noted that, although the Namespace Zoning method embodiments have been introduced in the context of EBOFs, Namespace Zoning may be used with any NVM subsystem to centralize all storage management on the CDC. Note that, as illustrated in FIG. 15, a single management interface may be used for both connectivity zoning and namespace zoning in contrast with the prior approaches illustrated in FIG. 1 that required two different management interfaces (i.e., 115 and 120). Also, the definitions of Namespace ZoneGroups, Namespace Zones, Namespace Zone Members, Namespace ZoneAlias, and Namespace ZoneAlias Members expand the NVMe-oF Zoning framework from just connectivity control to full Namespace allocation.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 17:
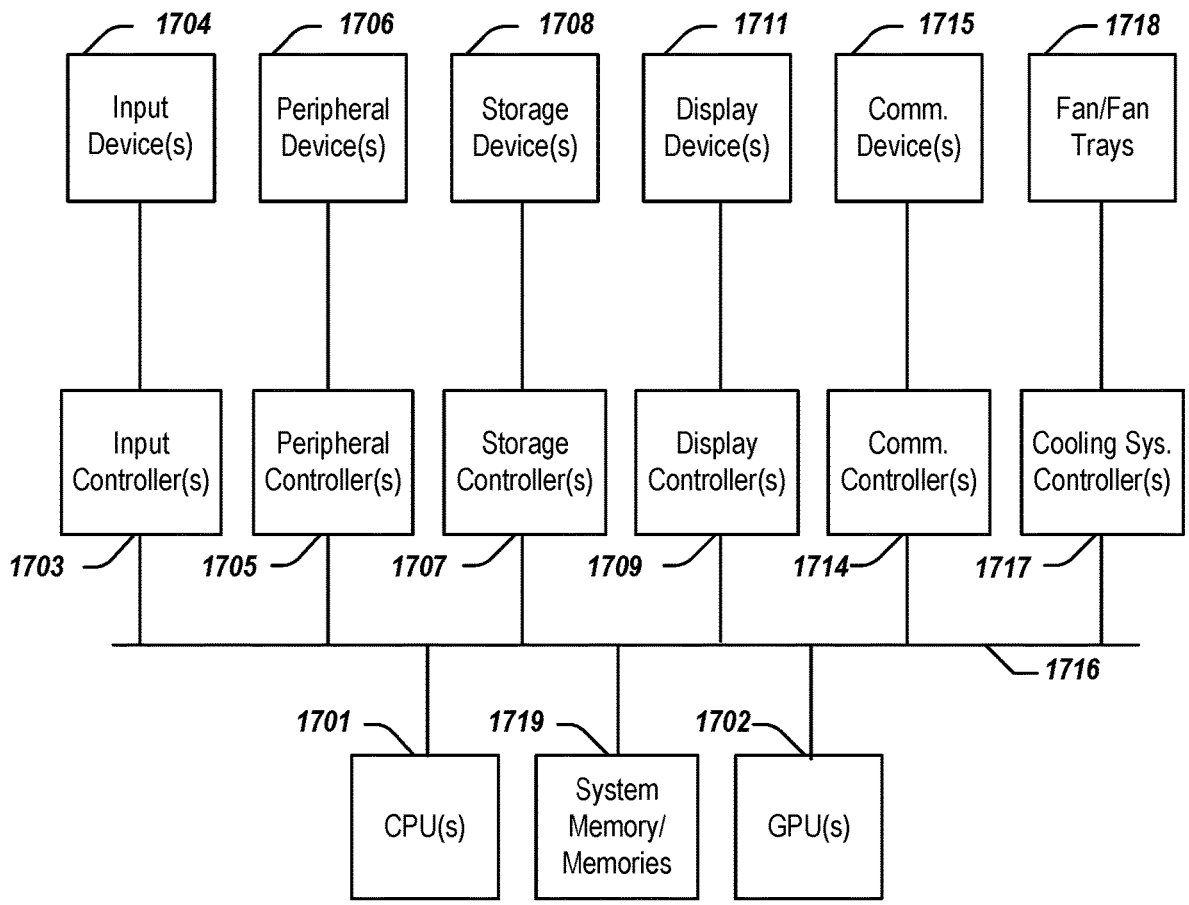
FIG. 17 depicts a simplified block diagram of an information handling system, according to embodiments of the present disclosure.

FIG. 17 depicts a simplified block diagram of an information handling system (or computing system), according to embodiments of the present disclosure. It will be understood that the functionalities shown for system 1700 may operate to support various embodiments of a computing system—although it shall be understood that a computing system may be differently configured and include different components, including having fewer or more components as depicted in FIG. 17.

As illustrated in FIG. 17, the computing system 1700 includes one or more CPUs 1701 that provides computing resources and controls the computer. CPU 1701 may be implemented with a microprocessor or the like and may also include one or more graphics processing units (GPU) 1702 and/or a floating-point coprocessor for mathematical computations. In one or more embodiments, one or more GPUs 1702 may be incorporated within the display controller 1709, such as part of a graphics card or cards. The system 1700 may also include a system memory 1719, which may comprise RAM, ROM, or both.

A number of controllers and peripheral devices may also be provided, as shown in FIG. 17. An input controller 1703 represents an interface to various input device(s) 1704, such as a keyboard, mouse, touchscreen, stylus, microphone, camera, trackpad, display, etc. The computing system 1700 may also include a storage controller 1707 for interfacing with one or more storage devices 1708 each of which includes a storage medium such as magnetic tape or disk, or an optical medium that might be used to record programs of instructions for operating systems, utilities, and applications, which may include embodiments of programs that implement various aspects of the present disclosure. Storage device(s) 1708 may also be used to store processed data or data to be processed in accordance with the disclosure. The system 1700 may also include a display controller 1709 for providing an interface to a display device 1711, which may be a cathode ray tube (CRT) display, a thin film transistor (TFT) display, organic light-emitting diode, electroluminescent panel, plasma panel, or any other type of display. The computing system 1700 may also include one or more peripheral controllers or interfaces 1705 for one or more peripherals 1706. Examples of peripherals may include one or more printers, scanners, input devices, output devices, sensors, and the like. A communications controller 1714 may interface with one or more communication devices 1715, which enables the system 1700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1700 comprises one or more fans or fan trays 1718 and a cooling subsystem controller or controllers 1717 that monitors thermal temperature(s) of the system 1700 (or components thereof) and operates the fans/fan trays 1718 to help regulate the temperature.

In the illustrated system, all major system components may connect to a bus 1716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 18:
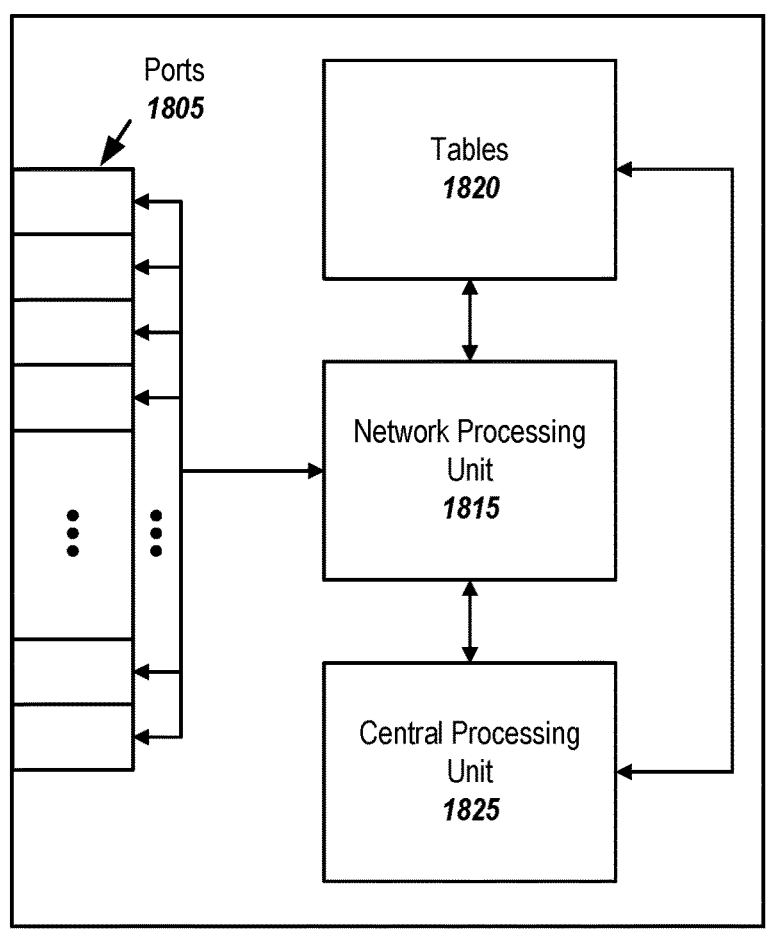
FIG. 18 depicts an alternative block diagram of an information handling system, according to embodiments of the present disclosure.

FIG. 18 depicts an alternative block diagram of an information handling system, according to embodiments of the present disclosure. It will be understood that the functionalities shown for system 1800 may operate to support various embodiments of the present disclosure—although it shall be understood that such system may be differently configured and include different components, additional components, or fewer components.

The information handling system 1800 may include a plurality of I/O ports 1805, a network processing unit (NPU) 1815, one or more tables 1820, and a CPU 1825. The system includes a power supply (not shown) and may also include other components, which are not shown for sake of simplicity.

In one or more embodiments, the I/O ports 1805 may be connected via one or more cables to one or more other network devices or clients. The network processing unit 1815 may use information included in the network data received at the node 1800, as well as information stored in the tables 1820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for centralized management of one or more storage elements in a storage subsystem of a storage system comprising one or more storage subsystems, the method comprising:
for each storage element of a set of storage elements of the storage subsystem:
at a centralized discovery controller that is communicatively coupled using a non-volatile memory express (NVMe) over Fabric (NVMe-oF) fabric to the storage subsystem, the centralized discovery controller is not collocated on any storage subsystem of the storage system and the centralized discovery controller performing steps comprising:
obtaining one or more transport addresses for the storage element;
connecting to the storage element of the storage subsystem;
retrieving information about one or more namespaces available on the storage element; and
responsive to receiving an assignment of a host to a namespace on the storage element:
defining namespace zoning information comprising namespace access control information that associates the host and that namespace of the storage element to facilitate access by the host to that namespace of the storage element of the storage subsystem; and
transmitting the namespace zoning information to the storage subsystem.

2. The computer-implemented method of claim 1 wherein access control given the namespace zoning information is enforced by a controller.

3. The computer-implemented method of claim 1 wherein the namespace zoning information comprises:
a namespace zone which comprises:
a namespace zone name identifier; and
a listing of namespace zone members for this namespace zone, which includes an identifier for the host and an identifier for the namespace of the storage element in the storage subsystem as namespace zone members.

4. The computer-implemented method of claim 3 wherein the listing of namespace zone members for this namespace zone further comprises:
an identifier for each additional host, if any, that is a namespace zone member of this namespace zone; and
an identifier for each additional namespace of a storage element, if any, that is a namespace zone member of this namespace zone.

5. The computer-implemented method of claim 3 wherein the namespace zone is defined to be included as part of a namespace zone group that comprises one or more namespace zones.

6. The computer-implemented method of claim 1, further comprising:
registering the storage subsystem with the centralized discovery controller.

7. The computer-implemented method of claim 6, wherein the registering is performed as part of a push registration or a pull registration in which the storage subsystem provides a transport address for the storage subsystem to the centralized discovery controller.

8. An information handling system for centralized management of one or more storage elements in a storage subsystem of a storage system comprising one or more storage subsystems, the information handling system comprising:
one or more processors; and
a non-transitory computer-readable medium or media comprising one or more sets of instructions which, when executed by at least one of the one or more processors, causes steps to be performed comprising:
for each storage element of a set of storage elements of the storage subsystem:
at a centralized discovery controller that is communicatively coupled using a non-volatile memory express (NVMe) over Fabric (NVMe-oF) fabric to the storage subsystem, the centralized discovery controller is not collocated on any storage subsystem of the storage system and the centralized discovery controller performing steps comprising:
obtaining one or more transport addresses for the storage element;
connecting to the storage element of the storage subsystem;
retrieving information about one or more namespaces available on the storage element; and
responsive to receiving an assignment of a host to a namespace on the storage element:
defining namespace zoning information comprising namespace access control information that associates the host and that namespace of the storage element to facilitate access by the host to that namespace of the storage element of the storage subsystem; and
transmitting the namespace zoning information to the storage subsystem.

9. The information handling system of claim 8 wherein access control given the namespace zoning information is enforced by a controller.

10. The information handling system of claim 8 wherein the namespace zoning information comprises:
a namespace zone which comprises:
a namespace zone name identifier; and
a listing of namespace zone members for this namespace zone, which includes an identifier for the host and an identifier for the namespace of the storage element in the storage subsystem as namespace zone members.

11. The information handling system of claim 10 wherein the listing of namespace zone members for this namespace zone further comprises:
an identifier for each additional host, if any, that is a namespace zone member of this namespace zone; and
an identifier for each additional namespace of a storage element, if any, that is a namespace zone member of this namespace zone.

12. The information handling system of claim 10 wherein the namespace zone is defined to be included as part of a namespace zone group that comprises one or more namespace zones.

13. The information handling system of claim 8 wherein the non-transitory computer-readable medium or media further comprising one or more sequences of instructions which, when executed by at least one processor, causes steps to be performed comprising:
registering the storage subsystem with the centralized discovery controller.

14. The information handling system of claim 13 wherein the registering is performed as part of a push registration or a pull registration in which the storage subsystem provides a transport address for the storage subsystem to the centralized discovery controller.

15. A non-transitory computer-readable medium or media comprising one or more sequences of instructions which, when executed by at least one processor, causes steps to be performed comprising:
- for each storage element of a set of storage elements of a storage subsystem in a storage system comprising one or more storage subsystems:
  - at a centralized discovery controller that is communicatively coupled using a non-volatile memory express (NVMe) over Fabric (NVMe-oF) fabric to the storage subsystem, the centralized discovery controller is not collocated on any storage subsystem of the storage system and the centralized discovery controller performing steps comprising:
    - obtaining one or more transport addresses for the storage element;
    - connecting to the storage element of the storage subsystem;
    - retrieving information about one or more namespaces available on the storage element; and
    - responsive to receiving an assignment of a host to a namespace on the storage element:
      - defining namespace zoning information comprising namespace access control information that associates the host and that namespace of the storage element to facilitate access by the host to that namespace of the storage element of the storage subsystem; and
      - transmitting the namespace zoning information to the storage subsystem.

16. The non-transitory computer-readable medium or media of claim 15 wherein access control given the namespace zoning information is enforced by a controller.

17. The non-transitory computer-readable medium or media of claim 15 wherein the namespace zoning information comprises:
- a namespace zone which comprises:
  - a namespace zone name identifier; and
  - a listing of namespace zone members for this namespace zone, which includes an identifier for the host and an identifier for the namespace of the storage element in the storage subsystem as namespace zone members.

18. The non-transitory computer-readable medium or media of claim 17 wherein the listing of namespace zone members for this namespace zone further comprises:
- an identifier for each additional host, if any, that is a namespace zone member of this namespace zone; and
- an identifier for each additional namespace of a storage element, if any, that is a namespace zone member of this namespace zone.

19. The non-transitory computer-readable medium or media of claim 18 wherein the namespace zone is defined to be included as part of a namespace zone group that comprises one or more namespace zones.

20. The non-transitory computer-readable medium or media of claim 18 further comprising one or more sequences of instructions which, when executed by at least one processor, causes steps to be performed comprising:
- registering the storage subsystem with the centralized discovery controller.

* * * * *